US010760707B2

(12) United States Patent
Frippiat et al.

(10) Patent No.: US 10,760,707 B2
(45) Date of Patent: Sep. 1, 2020

(54) FLUID VALVE

(71) Applicant: SAFRAN AERO BOOSTERS S.A., Herstal (Milmort) (BE)

(72) Inventors: Cédric Frippiat, Theux (BE); Jean-Christian Bomal, Melen (BE); Nicolas Paulus, Liège (BE)

(73) Assignee: SAFRAN AERO BOOSTERS S.A., Herstal (Milmort) (BE)

( * ) Notice: Subject to any disclaimer, the term of this patent is extended or adjusted under 35 U.S.C. 154(b) by 119 days.

(21) Appl. No.: 15/721,356

(22) Filed: Sep. 29, 2017

(65) Prior Publication Data
US 2018/0094745 A1 Apr. 5, 2018

(30) Foreign Application Priority Data
Sep. 30, 2016 (BE) .................................. 2016/5728

(51) Int. Cl.
*F16K 31/40* (2006.01)
*F16K 31/42* (2006.01)
*F16K 11/07* (2006.01)

(52) U.S. Cl.
CPC ........ *F16K 31/408* (2013.01); *F16K 11/0716* (2013.01); *F16K 31/426* (2013.01); *Y10T 137/8671* (2015.04); *Y10T 137/86702* (2015.04)

(58) Field of Classification Search
CPC ...... F16K 31/423; F16K 31/426; F16K 11/07; F16K 11/0716; F16K 11/048; F16K 31/408; F16K 31/0613; Y10T 137/86582; Y10T 137/86702; Y10T 137/8671; Y10T 137/86694; Y10T 137/86614

USPC ............. 137/625.6, 625.68, 625.64, 625.67, 137/625.69
See application file for complete search history.

(56) References Cited

U.S. PATENT DOCUMENTS

| 3,722,547 | A |   | 3/1973 | Kirstein |   |
|---|---|---|---|---|---|
| 4,245,671 | A |   | 1/1981 | Kosugui |   |
| 4,313,468 | A | * | 2/1982 | Patel | ................... F15B 13/0438 137/625.61 |

(Continued)

FOREIGN PATENT DOCUMENTS

| EP | 2 503 201 | A1 | 9/2012 |
| EP | 3 128 215 | A1 | 2/2017 |
| GB | 2 304 839 | A | 3/1997 |

OTHER PUBLICATIONS

Belgian Search Report and Written Opinion dated Jun. 26, 2017, for Belgian Application No. 201605728, filed Sep. 30, 2016, 14 pages.

*Primary Examiner* — Kelsey E Cary
(74) *Attorney, Agent, or Firm* — Christensen O'Connor Johnson Kindness PLLC

(57) ABSTRACT

A fluid valve includes a valve member located between a first cavity and a second cavity, and an actuator that includes a pilot. The valve member is moved by the balance between the pressure prevailing in the first cavity and the pressure prevailing in the second cavity. The valve member includes a longitudinal hole that can be blocked by the pilot so as to modify the pressure prevailing in the first cavity and the force acting on the valve member so as to vary a fluid flow rate between an inlet and two outlets. The valve member is attached to a piston, one end of which is located in a third cavity. The force acting on the valve member is determined by the pressures prevailing in the various cavities.

16 Claims, 5 Drawing Sheets

(56) References Cited

U.S. PATENT DOCUMENTS

| | | | |
|---|---|---|---|
| 8,397,759 B2 | 3/2013 | Oikawa et al. | |
| 9,080,687 B2 | 7/2015 | Franconi et al. | |
| 2001/0037831 A1* | 11/2001 | Venditti | F16K 31/0613 |
| | | | 137/625.69 |
| 2009/0140192 A1* | 6/2009 | Yamamoto | G05D 16/2026 |
| | | | 251/129.15 |
| 2012/0247594 A1* | 10/2012 | Inagaki | F15B 5/006 |
| | | | 137/625.69 |
| 2012/0292540 A1* | 11/2012 | Bruck | F16K 11/0716 |
| | | | 251/14 |
| 2017/0037984 A1 | 2/2017 | Frippiat et al. | |

* cited by examiner

FLUID VALVE

BACKGROUND

The present disclosure relates to a fluid valve, for example a three-way valve.

Prior art document GB 2343935 describes a fluid valve comprising a valve member and an actuator. Movement of the actuator causes the valve member to move so as to control a flow of fluid through the fluid valve. The valve member is attached to a spring. When the spring moves out of its position of equilibrium as a result of movements of the valve member, a return force urges said spring back into its position of equilibrium, the valve member being moved therewith.

One problem with the fluid valve described in GB 2343935 is that the return force acting on the valve member increases as the spring moves further away from its position of equilibrium. Therefore, said return force increases as the valve member moves. The return force varying in this manner according to the position of the valve member is detrimental to the control that the actuator has on the position of the valve member, in particular when the valve member is moved to a high degree

SUMMARY

One of the objects of the invention is to provide a fluid valve in which the return force acting on the valve member thereof is independent of the position of the valve member. To this effect, the invention proposes a fluid valve for a hydraulic circuit of an apparatus of an aircraft, comprising:

a hollow valve body comprising an inlet, two outlets and a first communication means towards a first pressure;

an actuator located at least in part in the hole in the hollow valve body and comprising a movable pilot;

a valve member which is able to move in the valve body in order to at least partially block a passage between said inlet and one of the two outlets, said valve member defining, at least in part, a first cavity and a second cavity located on either side of said valve member in the hole in the valve body, said valve member comprising a longitudinal hole for bringing said first cavity and said second cavity into communication when said longitudinal hole is not blocked, and said pilot being capable of at least partially blocking a first opening to said longitudinal hole, the second cavity being provided so as to be fluidically connected at a second pressure by means of a second communication means, a piston having a first portion and a second portion, the first portion being mechanically coupled to said valve member in the second cavity, and the second portion being located at least in part in a third cavity and having a surface portion which is perpendicular, at least in part, to a movement direction of the piston, the third cavity being provided so as to be fluidically connected at a third pressure by means of a third connection means; and a fixed throttle in said first communication means such that movement of said movable pilot brings about a change in pressure in the first cavity in order to produce a movement force on said valve member so as to vary a fluid flow rate between the inlet and the two outlets.

In the fluid valve according to the invention, the pressure prevailing in the longitudinal hole is equal to the pressure prevailing in the second cavity. Movement of the pilot increases or reduces the fluid communication between the longitudinal hole and the first cavity. Therefore, this movement modifies the pressure prevailing in the first cavity. In other words, movement of the pilot modifies the difference in pressure between the first cavity and the second cavity. This difference in pressure generates a movement force on the valve member. If this force is great enough compared with the return force acting on the valve member, it allows the valve member to be moved.

In the fluid valve according to the invention, the pressure prevailing in the second cavity produces a force on the valve member and on the first portion of the piston, and the pressure prevailing in the third cavity produces a force on the second portion of the piston because the second portion of the piston has a surface on which this pressure can be applied.

Therefore, the return force on the valve member is due to the resultant of these two forces. Since the second cavity is connected at a second pressure and the third cavity is connected at a third pressure, the pressure prevailing in the second cavity and the pressure prevailing in the third cavity are independent of the position of the valve member. Therefore, the resultant of the forces is independent of the position of the valve member.

The fluid valve according to the invention may be what is referred to as a "hydraulic feedback" valve.

The communication means make it possible to fluidically connect the cavities to external cavities containing fluids at a given pressure or a reference pressure. Each communication means can connect a cavity at the same external pressure or at different external pressures.

The first pressure, the second pressure and the third pressure are preferably external pressures. The first communication means, the second communication means and the third communication means are preferably located at least in part in the valve body. The third pressure is preferably different from the second pressure. The third pressure is preferably greater than the second pressure. The third pressure is preferably equal to the first pressure. The second communication means preferably does not have a fixed throttle. The pressure prevailing in the second cavity is preferably equal to the second pressure. The third communication means preferably does not have a fixed throttle. The pressure prevailing in the third cavity is preferably equal to the third pressure.

The first portion of the piston is preferably attached to the valve member.

The actuator of the fluid valve according to the invention can be described as being immersed. Therefore, if the fluid valve according to the invention allows an oil flow rate to be controlled, the actuator is immersed in the oil when the fluid valve is in operation.

The pilot is sometimes referred to as a plunger by a person skilled in the art.

The term "fixed throttle" is known to a person skilled in the art. Various types of fixed throttle may be envisaged. A non-limiting example is a circular aperture made in a wall, the thickness of which is of the same order of magnitude as the diameter of said aperture. Other examples include an elbow and a diameter reducer.

The fluid valve according to the invention is a proportional valve, which is a term known to a person skilled in the art. Therefore, the passage between the inlet and each of the two outlets is controlled over the entire stroke range of the valve member. The valve according to the invention is therefore not just an ON-OFF valve. In the valve according to the invention, there is an infinite number of stable positions for the valve member: said valve therefore provides for effective control of the fluid flow rate between the inlet and the two outlets. The fluid valve according to the invention is not of the "direct drive" type.

The terms "inlet" and "outlets" of the hollow valve body could be interchanged. Indeed, this is dependent solely on the flow direction of the fluid, the flow rate of which is being controlled by the valve according to the invention. Therefore, the valve body could contain two inlets and one outlet. Likewise, the valve body could comprise more than one inlet and more than two outlets.

The valve member is preferably not attached to a spring.

The fluid communication between the first opening to the longitudinal hole in the valve member and the first cavity may be direct, for example, i.e. the first opening to the longitudinal hole leads into the first cavity. The fluid communication between the first opening to the longitudinal hole in the valve member and the first cavity may be indirect, for example may be produced via an intermediate communication means which may be a recess in the valve member.

According to a possible embodiment of the invention, the piston comprises a channel which brings the second cavity and the longitudinal hole in the valve member into fluid communication. This channel makes it possible for the pressure prevailing in the longitudinal hole to be equal to the pressure prevailing in the second cavity, even if the piston is attached to the valve member such that it surrounds the longitudinal hole. For example, if the second cavity is at the second pressure, the longitudinal hole is also at this pressure.

According to a possible embodiment of the invention, the third cavity is located in the hole in the valve body. This makes the fluid valve particularly robust.

According to a possible embodiment of the invention, the actuator is an electric solenoid actuator and the pilot is ferromagnetic.

According to a possible embodiment of the invention, the first communication means leads into the first cavity. This makes it possible for the pressure prevailing in the first cavity to be dependent on the first pressure in particular.

According to a possible embodiment of the invention, the valve member comprises a recess which receives a portion of the pilot, a wall of said recess being arranged so as to at least partially limit movement of the pilot. The wall of the recess thus acts as a stop for the pilot. This makes it possible to limit the movements of the pilot relative to the valve member, and therefore to increase the mechanical strength of the fluid valve. The first opening to the longitudinal hole preferably leads into the recess in the valve member. The recess in the valve member is preferably in fluid communication with the first cavity such that the first cavity and the second cavity are in fluid communication via the longitudinal hole when the first opening to the longitudinal hole is not blocked by the pilot.

According to a possible embodiment of the invention, the wall and the pilot are arranged such that movement of said pilot in a direction away from the second cavity can mechanically cause the valve member to move. The wall is preferably located opposite the end of the pilot that allows the longitudinal hole to be closed. Therefore, if the pilot is actuated so as to move away from the second cavity, it is brought into contact with the wall and pushes said wall so as to move it away from the second cavity. In other words, the pilot pulls the wall, and therefore the valve member, in a direction away from the second cavity.

According to a possible embodiment of the invention, the fluid valve comprises a spring which connects said pilot to a wall located opposite the pilot relative to the valve member. Said wall is a wall of the fourth cavity, for example. Said wall is a wall of the hole in the valve body, for example.

According to a possible embodiment of the invention, the pilot is provided so as to slide in a duct for bringing the first cavity and a fourth cavity into fluid communication. The fourth cavity is preferably located in the hole in the valve body. The duct is preferably located at least in part in the hole in the valve body.

According to a possible embodiment of the invention, the fourth cavity is provided so as to be fluidically connected at a fourth pressure by means of a fourth communication means. The fourth pressure is preferably an external pressure. The fourth pressure may be equal to the second pressure. The fourth pressure is preferably different from the pressure prevailing in the first cavity. The fourth communication means is preferably located at least in part in the hole in the valve body. The fourth communication means preferably does not have a fixed throttle. The pressure prevailing in the fourth cavity is preferably equal to the fourth pressure.

According to a possible embodiment of the invention, the pilot is arranged such that a fluid in the first cavity subjects it to a force which moves it away from the valve member. This makes it possible for movement of the pilot to bring about a change in pressure which produces a force on the pilot that acts in the direction opposite the movement direction of said pilot.

According to a possible embodiment of the invention, the pilot is arranged such that a fluid in the first cavity subjects it to a force directed towards the valve member. This makes it possible for movement of the pilot to bring about a change in pressure which produces a force on the pilot that acts in the same direction as said movement.

According to a possible embodiment of the invention, the pilot is arranged such that a fluid in the first cavity does not subject it to a force which moves it closer to or away from the valve member. This makes it possible for movement of the pilot to bring about a change in pressure which does not produce a force on the pilot that closes or opens the first opening to the longitudinal hole.

The inventors also propose a hydraulic circuit of an apparatus of an aircraft (for example a hydraulic circuit of a landing gear), a fuel cell system, a turbine engine and an aircraft, comprising one or more fluid valves according to the invention.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
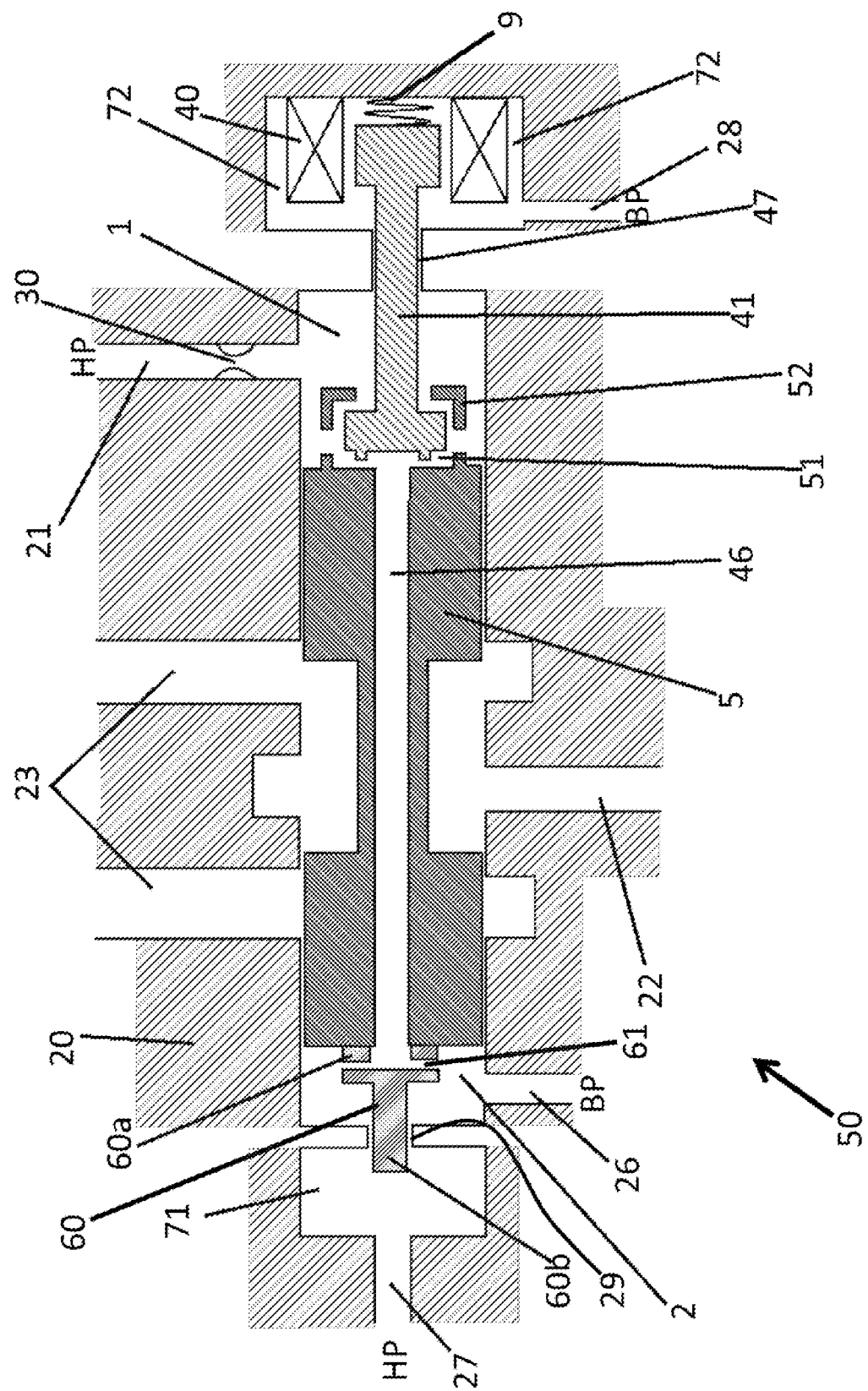
FIG. 1 shows a possible embodiment of the fluid valve according to the invention.

The present invention is described on the basis of particular embodiments and with reference to drawings; however, said embodiments and drawings do not have a limiting effect on the invention. The described drawings or figures are only schematic and are not limiting.

In the context of the present document, the terms "first" and "second" are used only to differentiate between different elements and do not indicate the order of these elements.

In the drawings, identical or similar elements may be provided with the same reference numerals.

FIG. 1 shows a possible embodiment of a fluid valve 50 according to the invention. The fluid valve 50 comprises a hollow valve body 20 comprising an inlet 22, two outlets 23 and a first communication means 21 at a first pressure, for example at a high pressure HP. The first communication means 21 comprises a fixed throttle 30.

The fluid valve 50 further comprises an actuator 40 located at least in part in the hole in the hollow valve body 20 and comprising a movable pilot 41. Preferably, the actuator 40 is an electric solenoid actuator and the pilot 41 is ferromagnetic. The actuator 40 may be another type of actuator.

The fluid valve 50 further comprises a valve member 5 which is able to move in the valve body 20. The valve member 5 makes it possible to at least partially block a passage between the inlet 22 and one of the two outlets 23. The valve member 5 defines, at least in part, a first cavity 1 and a second cavity 2 located on either side of the valve member 5 in the hole in the valve body 20.

The first communication means 21 is preferably fluidically connected to the first cavity 1. The first communication means 21 is preferably at least in part in the valve body 20.

The valve member 5 comprises a longitudinal hole 46 which brings the first cavity 1 and the second cavity 2 into direct or indirect fluid communication when said longitudinal hole is not blocked. A first opening to the longitudinal hole 46 preferably leads towards the first cavity 1 or into the first cavity 1. The pilot 41 is capable of at least partially blocking the first opening to the longitudinal hole 46. The pilot 41 is preferably located at least in part in the first cavity 1.

According to an embodiment of the invention, the valve member 5 comprises a recess 51 which receives a portion of the pilot 41, in particular the portion of the pilot 41 that allows the first opening to the longitudinal hole 46 to be blocked. A wall 52 of the recess 51 is arranged so as to at least partially limit movement of the pilot 41. The recess 51 is in fluid communication with the first cavity 1 such that the closing or opening of the first opening to the longitudinal hole 46 by the pilot 41 influences the pressure prevailing in the recess 51 in the valve member 5 and therefore influences the pressure prevailing in the first cavity 1.

The valve 50 is preferably arranged such that the pilot 41 can drive the wall 52, and therefore the valve member 5, towards the first cavity 1.

The second cavity 2 is fluidically connected at a second pressure, for example at a low external pressure BP, by means of a second communication means 26. The second communication means 26 preferably makes it possible for the second pressure to prevail in the second cavity 2.

The fluid valve 50 further comprises a third cavity 71 which is fluidically connected at a third pressure, for example at a high external pressure HP, by means of a third communication means 27. The third communication means 27 preferably makes it possible for the third pressure to prevail in the third cavity 71. The third cavity 71 is preferably located in the hole in the valve body 20.

The fluid valve 50 further comprises a piston 60 having a first portion 60a and a second portion 60b. The first portion 60a is attached to the valve member 5 in the second cavity 2. The second portion 60b is located at least in part in the third cavity 71. The first portion 60a of the piston 60 is preferably wider than the second portion 60b of the piston 60. The piston 60 preferably slides in a fifth communication means 29 between the second cavity 2 and the third cavity 71. The piston 60 is preferably immersed.

In an embodiment of the invention, the first portion 60a of the piston 60 is attached to the valve member 50 around a second opening to the longitudinal hole 46 and channels 61 are made therein that bring the second cavity 2 and the longitudinal hole 46 into fluid communication. This makes it possible for the forces resulting from the pressures on the piston to be aligned with the left-right movement of the valve member 5 and for the pressure prevailing in the second cavity 2 to also prevail in the longitudinal hole 46.

The second portion 60b of the piston 60 has a surface portion which is perpendicular, at least in part, to the sliding direction of the piston 60. This surface portion is located in the third cavity and faces a direction opposite the direction of the second cavity. In other words, this surface portion is arranged such that the piston 60 can be pushed towards the second cavity 2 by the pressure prevailing in the third cavity 71.

In an embodiment of the invention, the fluid valve 50 further comprises a fourth cavity 72, which is preferably located in the hole in the valve body 20. The fourth cavity 72 is fluidically connected to the first cavity 1 by means of a duct 47 in which a portion of the pilot 41 can slide. The fourth cavity 72 is preferably fluidically connected at a fourth pressure, for example at a low external pressure BP, by means of a fourth communication means 28. The fourth communication means 28 preferably makes it possible for the fourth pressure to prevail in the fourth cavity 72.

In an embodiment of the invention, the fluid valve 50 comprises a spring 9 which connects the pilot 41 to a wall located opposite the pilot 41 relative to the valve member 5. For example, the spring 9 can connect the pilot 41 to a wall of the fourth cavity 71. For example, the spring 9 can connect the pilot 41 to a wall of the hole in the valve body 20.

According to an embodiment, the fluid valve 50 can operate in the following manner.

In the first cavity 1, when an electric actuator moves the pilot 41 to the left, the first opening to the longitudinal duct 46, in which the low pressure BP prevails, is blocked further. The pressure in the first cavity 1 therefore increases, owing to the first communication means 21. This increase in pressure increases the force that pushes the valve member 5 to the left.

Conversely, in the first cavity 1, when an electric actuator moves the pilot 41 to the right, the first opening to the longitudinal duct 46, in which the low pressure BP prevails, is blocked to a lesser extent. The pressure in the first cavity 1 thus reduces. This reduction in pressure reduces the force that pushes the valve member 5 to the left.

In the second cavity 2, the force pushing the valve member 5 to the right originates (i) from the force due to the high pressure HP prevailing in the third cavity 71 and acting on the second portion 60b of the piston 60, and (ii) from the force due to the low pressure BP prevailing in the second cavity 2 and acting on the first portion 60a of the piston 60 and on the valve member 5.

The position of the valve member 5 is thus determined by the balance between the forces acting to the left in the first cavity 1 and to the right in the second cavity 2.

It is particularly advantageous for the first communication means 21 and the third communication means 27 to be connected at the same external pressure, since if this external pressure changes, the pressure in the first cavity 1 and the pressure in the third cavity 71 change to the same extent. Therefore, the leftward and rightward forces also increase to the same extent, and this increase in external pressure only has a slight influence on the position of the valve member 5.

Figure 2A:
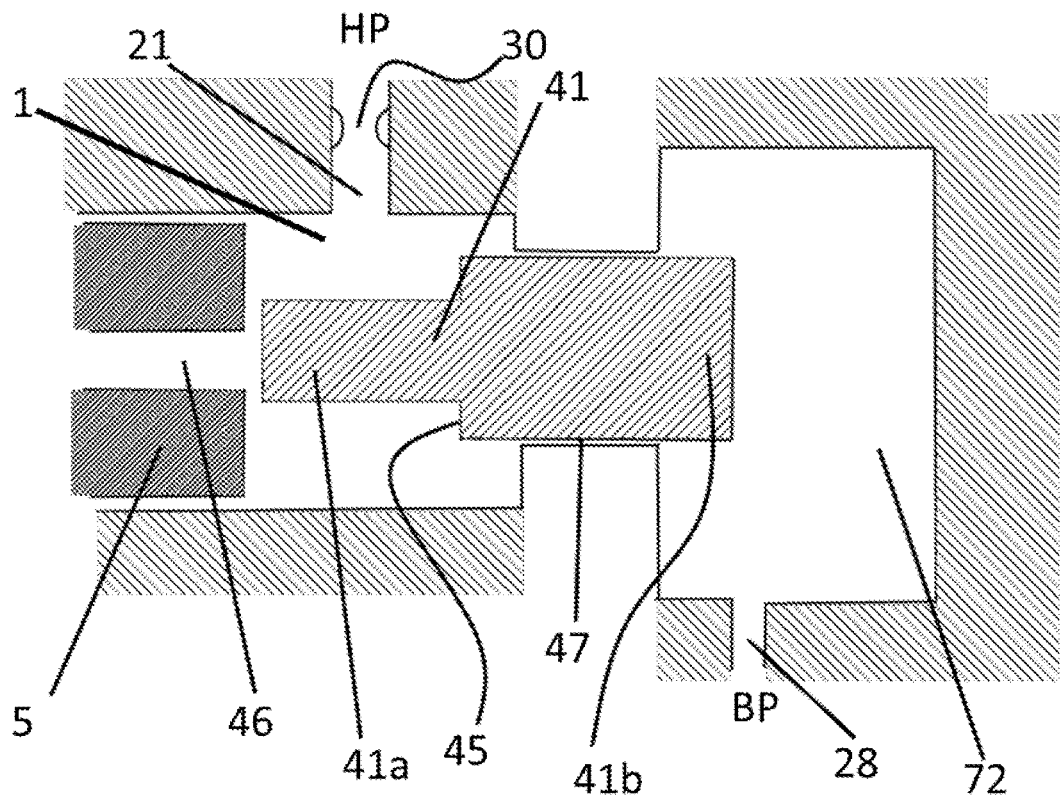
FIG. 2a is a close-up view of a pilot according to a first embodiment of the pilot, which can be used in a possible embodiment of the fluid valve according to the invention.
Figure 2B:
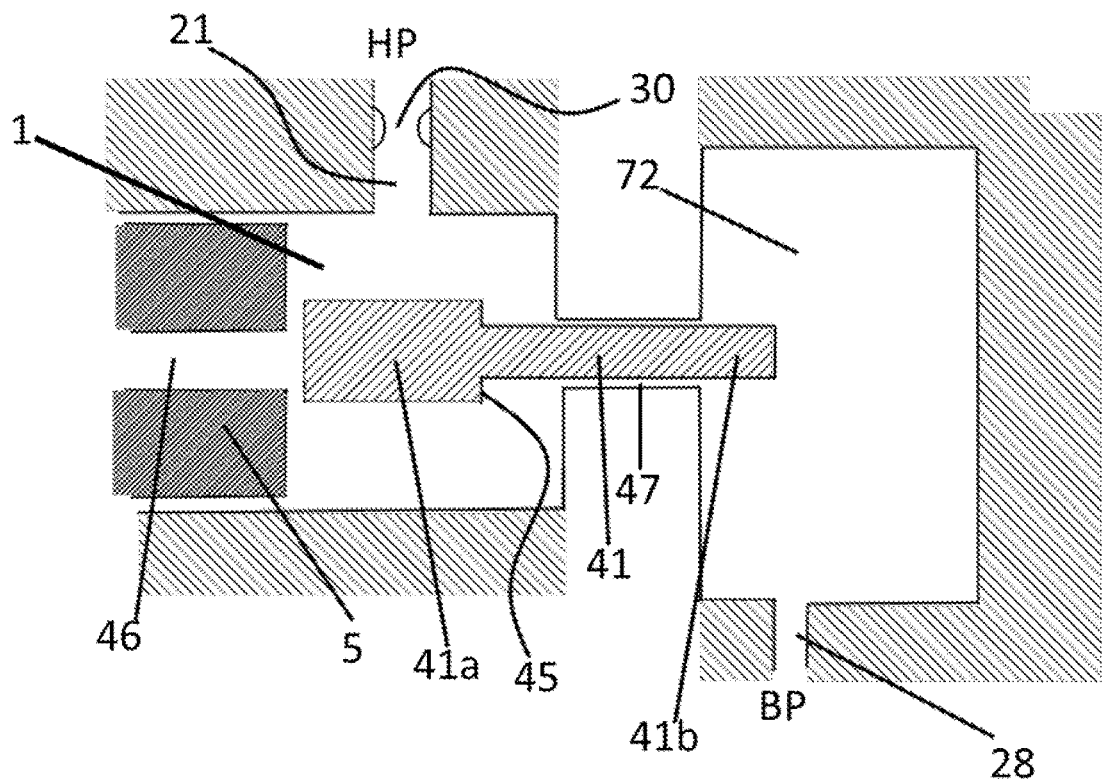
FIG. 2b is a close-up view of a pilot according to a second embodiment of the pilot, which can be used in a possible embodiment of the fluid valve according to the invention.
Figure 2C:
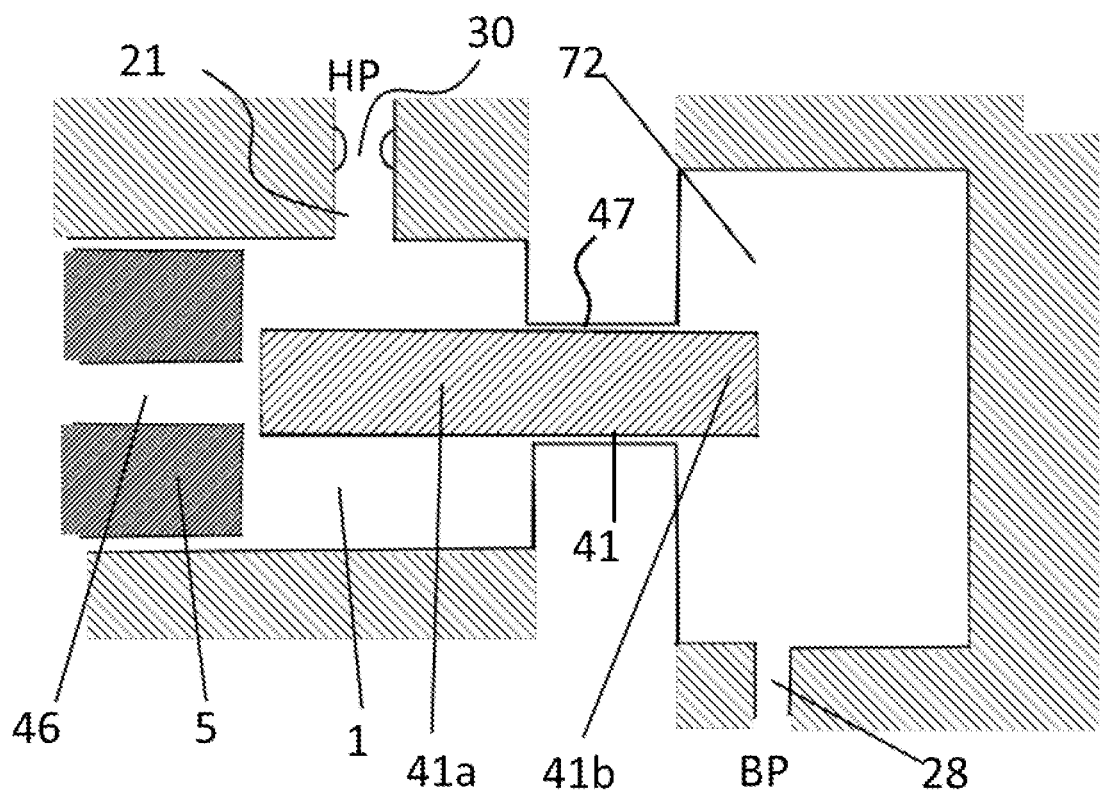
FIG. 2c is a close-up view of a pilot according to a third embodiment of the pilot, which can be used in a possible embodiment of the fluid valve according to the invention.

FIG. 2a shows the pilot 41 according to a first embodiment of the pilot 41. FIG. 2b shows the pilot 41 according to a second embodiment of the pilot 41. FIG. 2c shows the pilot 41 according to a third embodiment of the pilot 41. These three embodiments of the pilot 41 can be implemented in a fluid valve 50 according to an embodiment of the invention. These three embodiments of the pilot 41 can be implemented in a different fluid valve 50, for example in a mechanical feedback fluid valve, a hydraulic feedback valve or any other type of fluid valve. For example, the three embodiments of the pilot 41 described here are compatible with the fluid valves described in EP16179250, which is entitled "fluid valve".

According to the first embodiment of the pilot 41, shown in FIG. 2a, the pilot 41 comprises a first portion 41a which is located at least in part in the first cavity 1, and a second portion 41b which is located in part in the first cavity 1, in part in the duct 47 and in part in the fourth cavity 72. The first portion 41a is preferably narrower than the second portion 41b. Therefore, the pilot 41 comprises, in the first cavity 1, a surface 45 which is oriented towards the valve member 5. The pressure prevailing in the first cavity 1 pushes against said surface 45 in the direction away from the valve member 5 so as to counter the closing of the first opening to the longitudinal duct 46. In other words, the pilot 41 according to the first embodiment of the pilot 41 is arranged such that a fluid in the first cavity 1 subjects it to a force directed towards the fourth cavity 72, i.e. in the direction away from the valve member 5. The first portion 41a is preferably capable of at least partially blocking the first opening to the longitudinal hole 46.

Therefore, if the pilot 41 is moved to the left so as to further close the first opening to the longitudinal duct 46, the pressure in the first cavity 1 increases and so too does the rightward force acting on the surface 45 of the pilot 41. As a result, movement of the pilot 41 brings about a change in pressure in the first cavity 1, which produces a force on the pilot 41 in the direction opposite the direction of said movement. The fluid valve comprising the pilot 41 according to the first embodiment of the pilot 41 is thus particularly stable.

According to the second embodiment of the pilot 41, shown in FIG. 2b, the pilot 41 comprises a first portion 41a which is located at least in part in the first cavity 1, and a second portion 41b which is located in part in the first cavity 1, in part in the duct 47 and in part in the fourth cavity 72. The first portion 41a is preferably wider than the second portion 41b. Therefore, the pilot 41 comprises, in the first cavity 1, a surface 45 which is oriented away from the valve member 5. The pressure prevailing in the first cavity 1 pushes against said surface 45 towards the valve member 5 so as to promote the closing of the first opening to the longitudinal duct 46. In other words, the pilot 41 according to the second embodiment of the pilot 41 is arranged such that a fluid in the first cavity 1 subjects it to a force directed towards the valve member 5. The first portion 41a is preferably capable of at least partially blocking the first opening to the longitudinal hole 46.

Therefore, if the pilot 41 is moved to the left so as to further close the first opening to the longitudinal duct 46, the pressure in the first cavity 1 increases and so too does the leftward force acting on the surface 45 of the pilot 41. As a result, movement of the pilot 41 brings about a change in pressure in the first cavity 1, which produces a force on the pilot 41 in the direction of said movement. The fluid valve comprising the pilot 41 according to the second embodiment of the pilot 41 is thus particularly reactive and may be said to be "unstable".

According to the third embodiment of the pilot 41, shown in FIG. 2c, the pilot 41 does not comprise a plurality of portions which have different diameters and merge with one another in the first cavity 1. The pressure prevailing in the first cavity 1 therefore does not have much influence on the movement of the pilot 41. In other words, the pilot 41 according to the third embodiment of the pilot 41 is arranged such that a fluid in the first cavity 1 does not subject it to a force directed towards the valve member 5 or away from the valve member 5.

Therefore, if the pilot 41 is moved to the left so as to further close the first opening to the longitudinal duct 46, the pressure in the first cavity 1 increases, but the leftward or rightward push force acting on the pilot 41 does not significantly change. The fluid valve comprising the pilot 41 according to the third embodiment of the pilot 41 is thus particularly balanced.

The three embodiments of the pilot 41 shown are only examples, and a person skilled in the art would understand that the shape of the pilot 41 and the arrangement thereof in the fluid valve 50 can be different so as to produce the desired effect of stability (first embodiment of the pilot 41), instability (second embodiment of the pilot 41) or equilibrium (third embodiment of the pilot 41).

Figure 3:
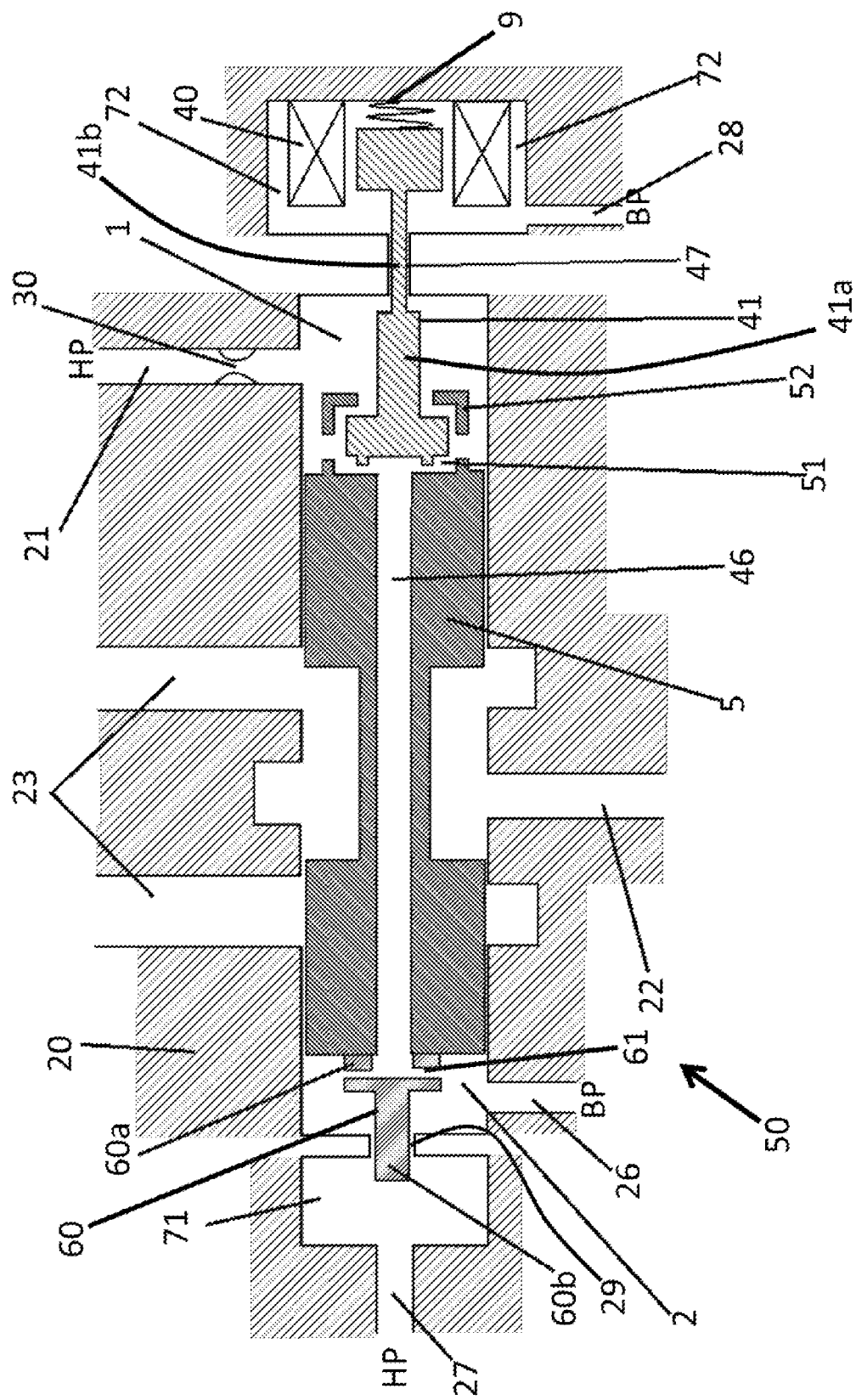
FIG. 3 shows a possible embodiment of the fluid valve according to the invention, in which it comprises a pilot according to the second embodiment of the pilot.

FIG. 3 is a sectional view of a fluid valve 50 according to a possible embodiment of the invention. According to this embodiment, the fluid valve 50 comprises a pilot 41 according to the second embodiment of the pilot 41.

Figure 4:
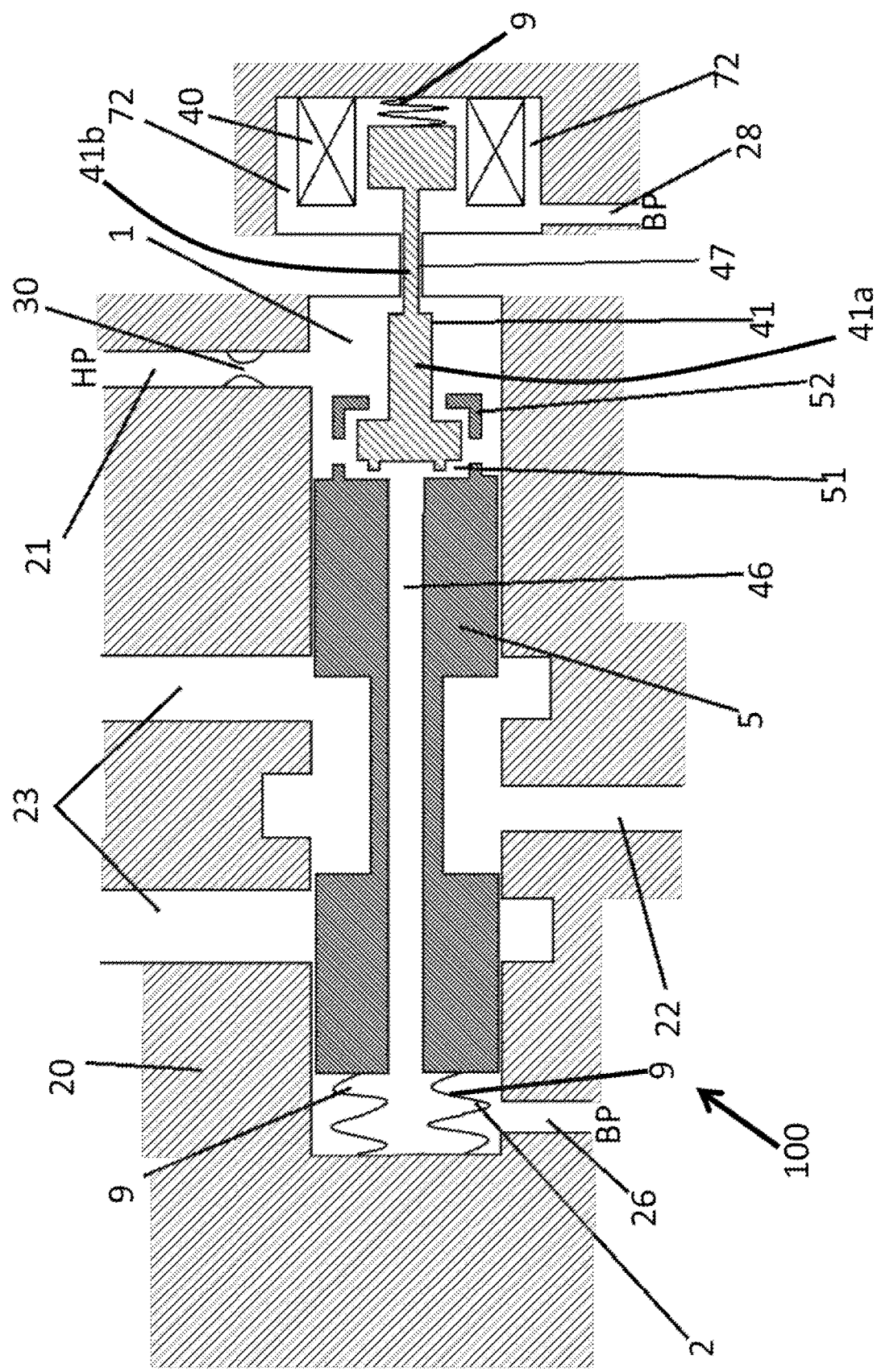
FIG. 4 shows a fluid valve comprising a pilot according to the second embodiment of the pilot.

FIG. 4 is a sectional view of a mechanical feedback fluid valve 100. The mechanical feedback fluid valve 100 shown comprises a pilot 41 according to the second embodiment of the pilot 41.

In other words, the invention relates to a fluid valve 50 comprising a valve member 5 located between a first cavity 1 and a second cavity 2, and an actuator 40 comprising a pilot 41. The valve member 5 is moved owing to the balance between the pressure prevailing in the first cavity 1 and the pressure prevailing in the second cavity 2. The valve member 5 comprises a longitudinal hole 46 which can be blocked by the pilot 41 so as to modify the pressure prevailing in the first cavity 1 and the leftward force acting on the valve member 5. The valve member 5 is attached to a piston 60, one end of which is located in a third cavity 71. The force acting on the valve member 5 is determined by the pressures prevailing in the various cavities.

The present invention has been described with reference to specific embodiments which are purely illustrative and must not be considered to have a limiting effect. In a general manner, the present invention is not limited to the examples shown and/or described above. The use of the verbs "comprise", "include" or have" or any other variant, including the conjugated forms thereof, can in no way exclude the presence of elements other than those mentioned. The use of the indefinite article "a" or "an" or the definite article "the" to introduce an element does not exclude the presence of a plurality of these elements. The reference numerals in the claims do not limit the scope thereof.

While illustrative embodiments have been illustrated and described, it will be appreciated that various changes can be made therein without departing from the spirit and scope of the invention.

The embodiments of the invention in which an exclusive property or privilege is claimed are defined as follows:

1. A fluid valve for a hydraulic circuit of an apparatus of an aircraft, comprising:
   a hollow valve body comprising an inlet, two outlets, and a first communication means connected to a first pressure;
   an actuator located at least in part in a hole in the hollow valve body and comprising a movable pilot;
   a valve member configured to move in the valve body in order to at least partially block a passage between said inlet and one of the two outlets, said valve member defining, at least in part, a first cavity and a second cavity located on either side of said valve member in the hole in the valve body,
   wherein:
   said valve member comprises a longitudinal hole bringing said first cavity and said second cavity into communication when said longitudinal hole is not blocked,
   said pilot is configured to at least partially block a first opening to said longitudinal hole,
   the second cavity is provided to be fluidically connected at a second pressure by means of a second communication means, said second communication means being open independently of the position of the valve member, in such a way that the pressure prevailing in the second cavity is equal to the second pressure independently of the position of the valve member,
   and in that the fluid valve further comprises:
   a fixed throttle in said first communication means,
   a third cavity having a communication means fluidically connecting said third cavity at a third pressure, said communication means being open independently of the position of the valve member, in such a way that the pressure prevailing in the third cavity is equal to the third pressure independently of the position of the valve member, and
   a piston fastened to the valve member in such a way that the piston and the valve member are immovable with respect to each other, the piston having a first portion and a second portion, the first portion being in the second cavity, and the second portion being located at least in part in the third cavity and having a surface portion located in the third cavity, facing a direction opposite the direction of the second cavity and which is perpendicular, at least in part, to a movement direction of the piston, such that movement of said movable pilot induces a change in pressure in the first cavity in order to produce a movement force on said valve member to vary a fluid flow rate between the inlet and the two outlets,
   wherein the second cavity is located between the third cavity and the valve member.

2. The fluid valve according to claim 1, wherein the piston comprises a channel configured to bring the second cavity and the longitudinal hole in the valve member into fluid communication.

3. The fluid valve according to claim 1, wherein the third cavity is located in the hole of the valve body.

4. The fluid valve according to claim 1, wherein the actuator is an electric solenoid actuator, and the pilot is ferromagnetic.

5. The fluid valve according to claim 1, wherein the valve member comprises a recess that receives a portion of the pilot, a wall of said recess being arranged to at least partially limit movement of the pilot.

6. The fluid valve according to claim 5, wherein the wall and the pilot are arranged such that movement of said pilot in a direction opposite to the second cavity mechanically drives a motion of the valve member.

7. The fluid valve according to claim 1, wherein the fluid valve comprises a spring connecting said pilot to a wall located opposite said pilot relative to the valve member.

8. The fluid valve according to claim 1, wherein the pilot is slidable in a duct to bring the first cavity and a fourth cavity into fluid communication.

9. The fluid valve according to claim 8, wherein the pilot comprises a first portion located at least in part in the first cavity, and a second portion located in part in the first cavity and in part in the duct, wherein the first portion is narrower than the second portion.

10. The fluid valve according to claim 8, wherein the pilot comprises a first portion which is located at least in part in the first cavity, and a second portion which is located in part in the first cavity and in part in the duct, wherein the first portion is wider than the second portion.

11. The fluid valve according to claim 8, wherein the pilot does not comprise several portions having different diameters and merging with one another in the first cavity.

12. A hydraulic circuit of an apparatus of an aircraft, comprising a fluid valve according claim 1.

13. A fuel cell system, comprising a fluid valve according to claim 1.

14. A turbine engine of an aircraft, comprising a fluid valve according to claim 1.

15. An aircraft, comprising a fluid valve according to claim 1.

16. The fluid valve according to claim 1, wherein the valve member is made of one piece or is made of pieces that are fastened together in such a way that all pieces of the valve member are immovable with respect to each other.

* * * * *